United States Patent [19]

Bromley

[11] 4,348,250

[45] Sep. 7, 1982

[54] SINGLE FACER FOR MAKING SINGLE FACED CORRUGATED MATERIAL

[75] Inventor: Harold Bromley, Bristol, England

[73] Assignee: Masson Scott Thrissell Engineering, Bristol, England

[21] Appl. No.: 234,151

[22] Filed: Feb. 13, 1981

[30] Foreign Application Priority Data

Feb. 20, 1980 [GB] United Kingdom ................. 8005708
Feb. 20, 1980 [GB] United Kingdom ................. 8005723

[51] Int. Cl.$^3$ ............................................... B29D 7/14

[52] U.S. Cl. .................................. 156/473; 29/121.1; 425/369

[58] Field of Search ................................ 156/205-210, 156/470-473; 425/336, 369, 396; 162/357, 296-297, 368-372; 100/121, 128; 29/121.1, 125

[56] References Cited

U.S. PATENT DOCUMENTS

| | | | |
|---|---|---|---|
| 652,280 | 6/1900 | Leske | 425/336 |
| 780,656 | 1/1905 | Hinkel | 425/367 |
| 2,975,833 | 3/1961 | Magnani | 162/369 X |
| 3,947,206 | 3/1976 | Delight | 425/369 X |
| 3,958,311 | 5/1976 | Kusters et al. | 29/447 X |
| 4,177,102 | 12/1979 | Tokuno | 425/369 X |
| 4,245,975 | 1/1981 | Hattori | 425/369 X |
| 4,270,969 | 6/1981 | Kelly | 425/369 X |

FOREIGN PATENT DOCUMENTS

| | | | |
|---|---|---|---|
| 906796 | 8/1972 | Canada | 162/372 |

*Primary Examiner*—David A. Simmons
*Attorney, Agent, or Firm*—Seidel, Gonda, Goldhammer & Panitch

[57] ABSTRACT

The second corrugating roll of a machine for making single-faced corrugated board is formed from an inner core and a cylindrical sleeve having a number of spaced circumferential grooves. The sleeve may be made up from a number of axially abutted rings, the circumferential grooves being formed in the abutting faces of adjacent rings. Longitudinal passageways are provided in the outer peripheral surface of the core and radial apertures connect the passageways with the grooves, so that suction applied to one end of the passageways holds the material being corrugated in the corrugations of the roll. In a modified form the passageways are formed in the inner peripheral surface of the sleeve.

The core is hollow and steam, or other heated fluid, passed through it to heat the roll.

9 Claims, 4 Drawing Figures

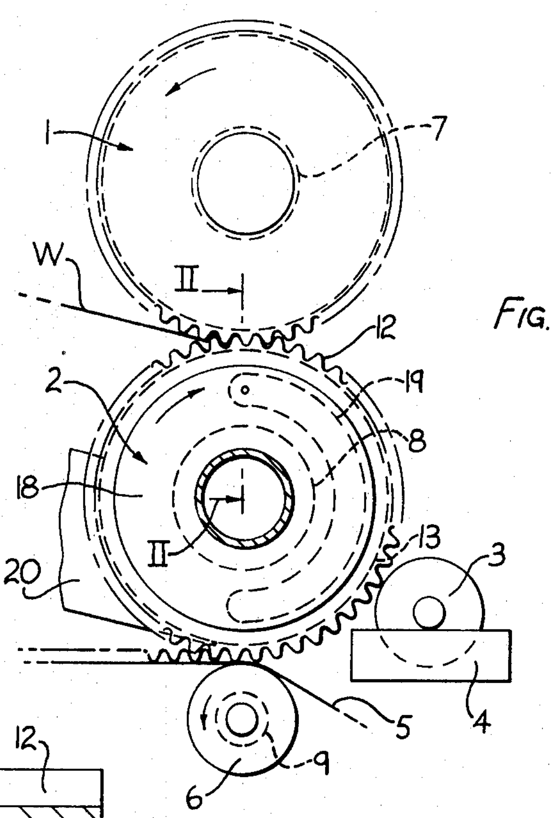
FIG. 1
FIG. 4
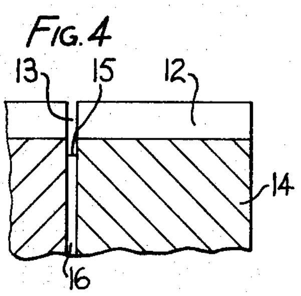
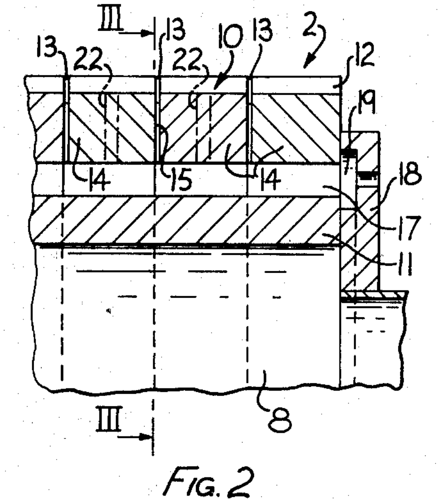
FIG. 2
FIG. 3
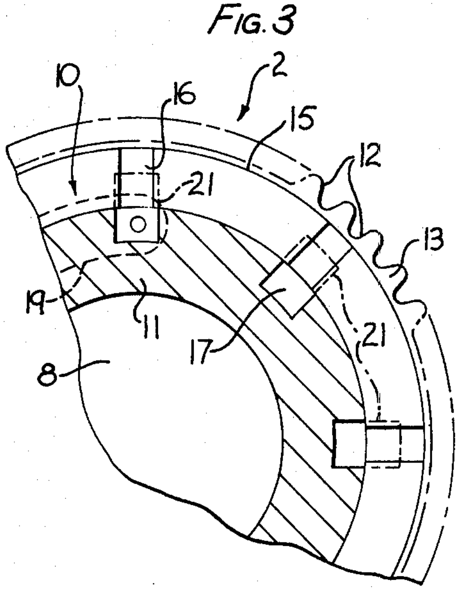

SINGLE FACER FOR MAKING SINGLE FACED CORRUGATED MATERIAL

This invention concerns improvements in or relating to single facers for making single faced corrugated material such as board.

According to the present invention there is provided a single facer for making single faced corrugated material such as board, comprising a first corrugating roll, having axially-extending corrugations, a second corrugating roll meshing with the first corrugating roll, means for feeding the material to be corrguated into the nip between the two rolls, means for applying adhesive to the tips of the corrugations produced in the material, means for feeding flat liner material on to the adhesive coated tips of the corrugated material, and means for pressing the liner on to the tips, wherein the second corrugating roll has axially-extending passageways, means for applying suction to at least one end of each of the passageways, and apertures extending substantially radially outwards from said passageways to apply suction from the passageways to the inside surface of the material being corrugated to hold the material into corrugations of the second roll, the second corrugating roll comprising an inner core and an outer sleeve means having on its outer surface the axially-extending corrugations and formed as a number of axially-abutted rings, the outer surface of the core being engaged with the inner surface of the sleeve means.

The passageways may be provided in one of the engaging surfaces of the core and the sleeve means.

There may be circumferentially-extending grooves in the corrugated surface of the second corrugating roll, some at least of the radially-extending apertures communicating with the grooves.

The circumferential grooves may be formed by providing a circumferential step at the outer edge of a ring of the sleeve means where it abuts the adjacent ring, and the radially-extending apertures may be radial slots in the circumferential steps.

Preferably the core is hollow and steam, or other heated fluid such as oil, is applied to the interior of the core.

Radial apertures may be provided in the sleeve means in the base of the corrugations and communicating with the passageways to apply suction to the material at positions spaced axially from the circumferential grooves.

The sleeve may be shrunk on to the core.

Preferably the suction is applied to the passageways through valve means such that suction is applied substantially to only that part of the sleeve means which carries the material being corrugated.

The invention will now be described by way of example only with reference to the accompanying drawings in which:

FIG. 1 is a diagrammatic end view of a machine for manufacturing corrugated board embodying the invention.

FIG. 2 is a section taken on the line II—II of FIG. 1 and drawn to a larger scale.

FIG. 3 is a section taken on the line III—III of FIG. 2, and

FIG. 4 is a view of part of FIG. 2 drawn to a larger scale.

Referring to FIG. 1, a web W is fed into the nip between first and second respective corrugating rolls 1 and 2, which mesh with each other so as to corrugate the web W. The corrugated web is held on the roll 2 by suction, as will be described later, and adhesive is applied to the ridges of the corrugations by an applicator wheel 3 which picks up adhesive from a tank 4. The flat liner web 5 is fed to a pressure roller 6 which presses the liner into contact with the corrugated web on the roll 2 to which it adheres, thus forming a single faced corrugated board, the suction applied to roll 2 being cut-off so that the board may be removed therefrom. The rolls 1 and 2 and the roller 6 are heated by having steam passed through them, and for this purpose they are formed respectively with hollow centre portions 7, 8 and 9. The rolls 1 and 2 and the roller 6 are driven in any convenient way in the directions shown by the arrows.

Referring also to FIGS. 2 and 3, the roll 2 is formed in two parts comprising a cylindrical sleeve 10 and an inner hollow core 11, the sleeve being shrunk on to the core 11. The outer peripheral surface of the sleeve 10 is formed with axial corrugations 12 and a number of axially spaced circumferential grooves 13.

The sleeve 10 is made up from a number of rings 14 which are axially abutted. The grooves 13 are formed by providing each of the rings 14 with a circumferential step 15 in one end face thereof where it abuts the adjacent ring 14, and radially-extending apertures in the form of slots 16 connect the bases of the grooves 13 with longitudinal passageways 17 formed in the outer peripheral surface of the core 11, at regularly spaced positions. The slots 16 may be formed by cutting away portions of the steps 15 at the appropriate positions in the end face of the rings 14.

The passageways 17 are connected to a source of suction (not shown) via a fixed valve 18 having an arcuate slot 19 formed in it so that suction is applied through the slots 16 to the grooves 13, and thus the corrugations of roll 2, only over that area of the roll 2 which is in contact with the corrugated web. Either or both ends of the passageways may be connected to the source of suction, and in the case of only one end being so connected, the other end has to be closed. Plates 20 (FIG. 1) are provided which extend into the grooves 13, over that portion of the roll 2 which is not in contact with the corrugated web, so as to ensure that the single faced board is removed from the roll 2.

In a modification the passageways 17 may be replaced by passageways 21 formed in the inner peripheral surface of the sleeve 10, as shown in chain-dot lines in FIG. 3. In this case the inner core 11 has a plain outer peripheral surface.

In a further modification further radial apertures may be provided in the sleeve means 10, between adjacent circumferential grooves 13. These may be positioned as shown in chain-dot lines at 22 in FIG. 2, and be holes drilled in the rings 14 connecting the base of the corrugations with the passageways 17 to apply suction to the corrugated web at positions spaced axially from the circumferential grooves.

We claim:

1. A single facer for making single faced corrugated material such as board, comprising a first corrugating roll having axially-extending corrugations, a second corrugating roll meshing with the first corrugating roll, means for feeding the material to be corrugated into the nip between the two rolls, means for applying adhesive to the tips of the corrugations produced in the material, means for feeding flat liner material on to the adhesive coated tips of the corrugated material, and means for pressing the liner on to the tips, wherein the second corrugating roll has axially-extending passageways, means for applying suction to at least one end of each of the passageways, and apertures extending substantially radially outwards from said passageways to apply suction from the passageways to the inside surface of the material being corrugated to hold the material into corrugations of the second roll, the second corrugating roll comprising an inner core and an outer sleeve means having on its outer surface the axially-extending corrugations and formed as a number of axially-abutted rings, the outer surface of the core being engaged with the inner surface of the sleeve means, said passageways being provided in one of the engaging surfaces of the core and the sleeve means.

2. A single facer as claimed in claim 1 further comprising circumferentially-extending grooves in the corrugated surface of the second corrugating roll, some at least of the radially-extending apertures communicating with the grooves.

3. A single facer as claimed in claim 2 in which the circumferential grooves are formed by providing a circumferential step at the outer edge of a ring of the sleeve means where it abuts the adjacent ring.

4. A single facer as claimed in claim 3 in which the radially-extending apertures are radial slots in the circumferential steps.

5. A single facer as claimed in claim 1 in which the core is hollow and steam, or other heated fluid such as oil, is applied to the interior of the core.

6. A single facer as claimed in claim 2 in which radial apertures are provided in the sleeve means in the base of the corrugations and communicating with the passageways to apply suction to the material at positions spaced axially from the circumferential grooves.

7. A single facer as claimed in claim 1 in which the rings are shrunk on to the core.

8. A single facer as claimed in claim 2 in which the suction is applied to the passageways through valve means such that suction is applied substantially to only that part of the sleeve means which carries the material being corrugated.

9. A single facer in accordance with claim 3 wherein said circumferential grooves are deeper than the depth of said corrugations so that said steps are closer to the axis of said corrugating roll than said corrugations, and said apertures being radially disposed slots in an end face of said steps.

* * * * *